United States Patent
Ertl

(10) Patent No.: US 6,539,852 B2
(45) Date of Patent: Apr. 1, 2003

(54) DEVICE FOR ATTACHING COMPENSATION WEIGHTS FOR PURPOSES OF UNBALANCE CORRECTION

(75) Inventor: Walter Ertl, Pfungstadt (DE)

(73) Assignee: Schenck Rotec GmbH (DE)

( * ) Notice: Subject to any disclaimer, the term of this patent is extended or adjusted under 35 U.S.C. 154(b) by 81 days.

(21) Appl. No.: 09/767,590

(22) Filed: Jan. 23, 2001

(65) Prior Publication Data

US 2001/0013256 A1 Aug. 16, 2001

(30) Foreign Application Priority Data

Feb. 11, 2000 (DE) .......................... 100 06 176

(51) Int. Cl.$^7$ .............................. B30B 5/02; B30B 1/32
(52) U.S. Cl. ..................... 100/211; 100/269.02; 73/468
(58) Field of Search ........................ 100/269.02, 269.03, 100/211; 73/468, 462, 487; 156/75, 538, 556, 349

(56) References Cited

U.S. PATENT DOCUMENTS

| 4,195,563 A | * | 4/1980 | Budraitis et al. ............. 100/50 |
| 5,300,170 A | * | 4/1994 | Donohoe .................... 100/207 |
| 5,557,043 A |   | 9/1996 | Drechsler |

FOREIGN PATENT DOCUMENTS

| DE | 9418991 U1 | 3/1995 |
| DE | 4432455 A1 | 3/1996 |
| DE | 4440812 C2 | 5/1996 |
| DE | 19922085    | 7/2000 |
| EP | 1233171     | 3/1967 |
| EP | 0681169 B1  | 8/1995 |

* cited by examiner

Primary Examiner—Allen Ostrager
Assistant Examiner—Jimmy Nguyen
(74) Attorney, Agent, or Firm—Connolly Bove Lodge & Hutz LLP

(57) ABSTRACT

A device for attaching a compensation weight (13) with an adhesive layer (17) to an attachment surface (18) of a vehicle wheel (19) for purposes of unbalance compensation. The device has holding structure with two holding parts to secure a compensation weight and with a pressing element (4) pressed onto a rear surface (16) of the compensation weight (13). A guide with which the holding structure may be guided to an unbalance compensation site of the attachment surface (18) and pressed thereto. The pressing element (4) has a pressing surface (8) deformable as a function of the pressing force so that rear surface (16) of the compensation weight lies on the pressing surface (8). The pressing surface (8) in the unstressed basic position of the pressing element (4) has a shape which transfers the pressing force to the middle section of the compensation weight (13). As the pressing force increases, the pressing surface (8) is deformed in such a way that the pressing force is also transferred onto the ends of the compensation weight (13).

14 Claims, 2 Drawing Sheets

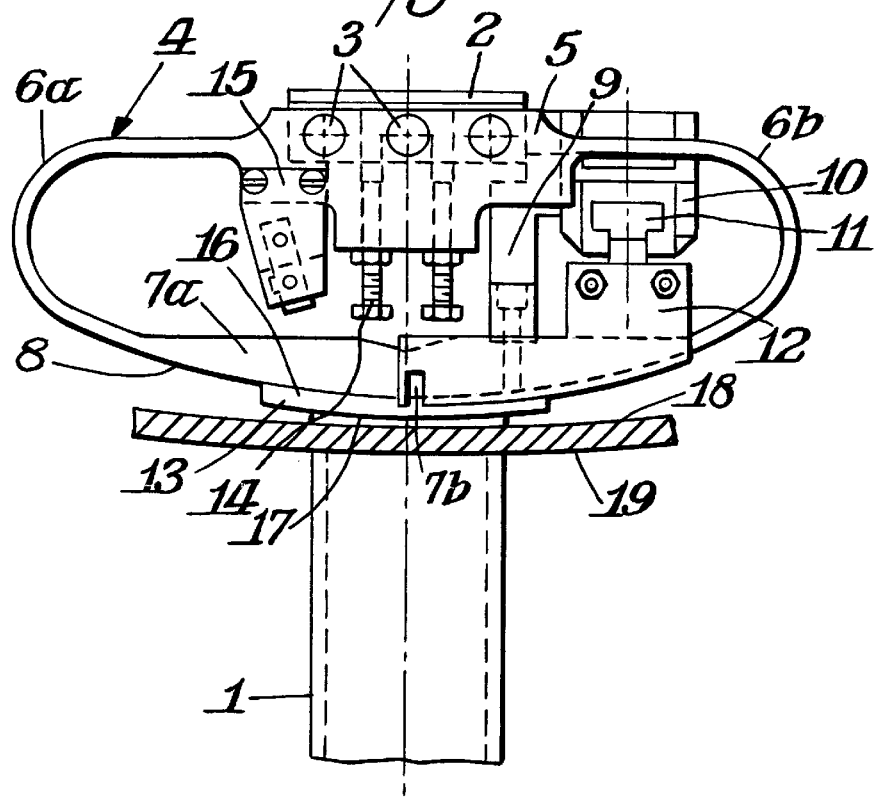
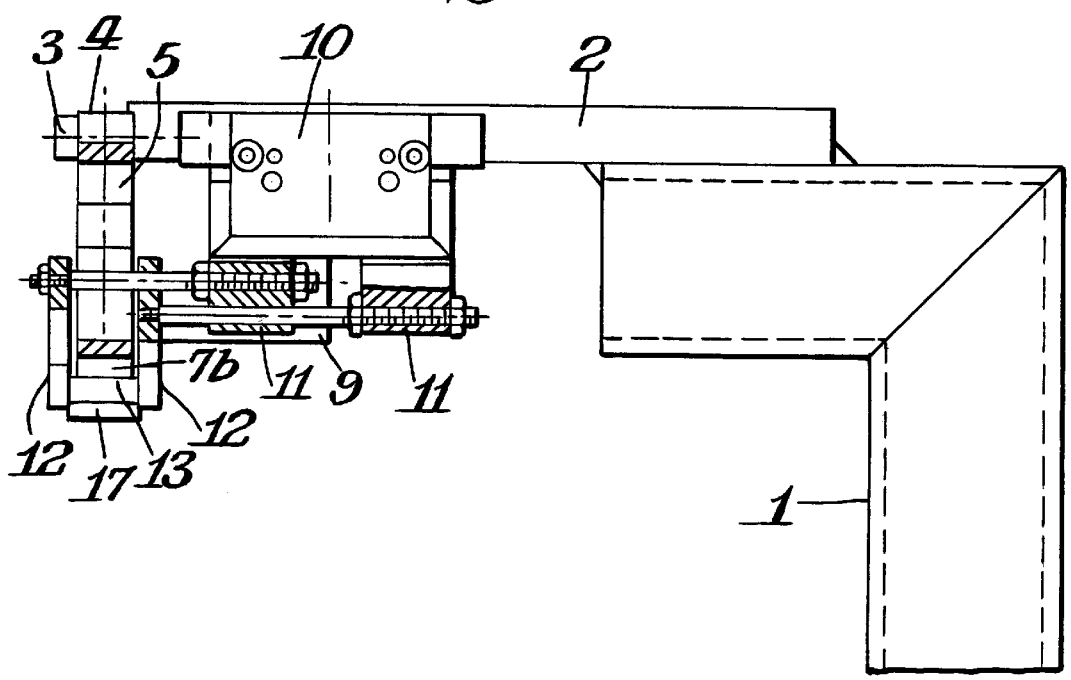

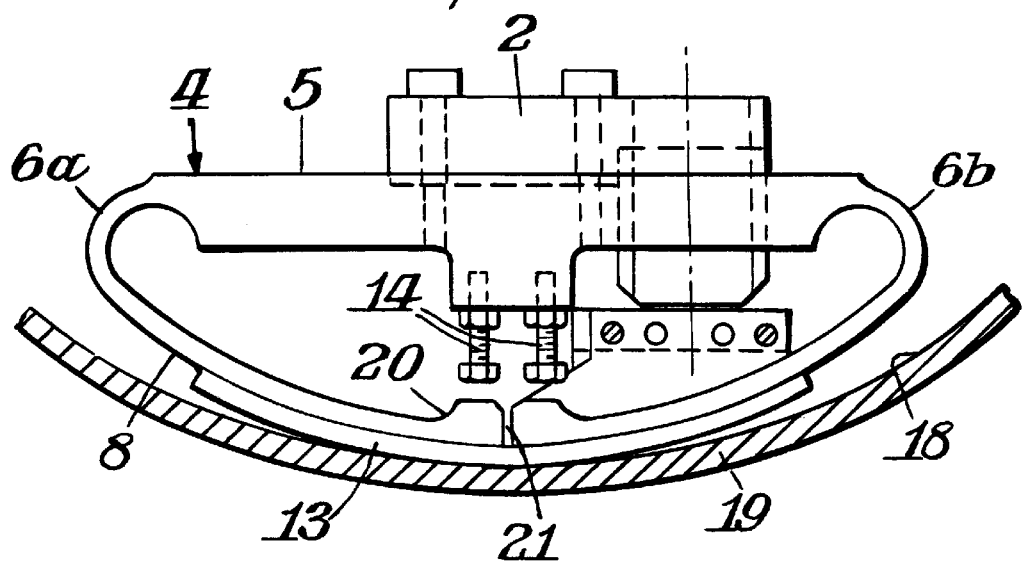
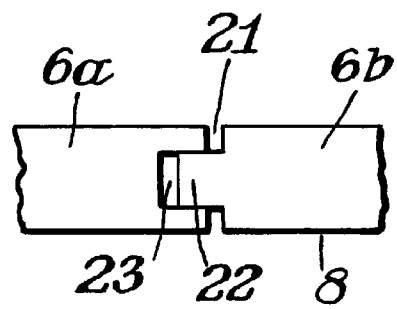
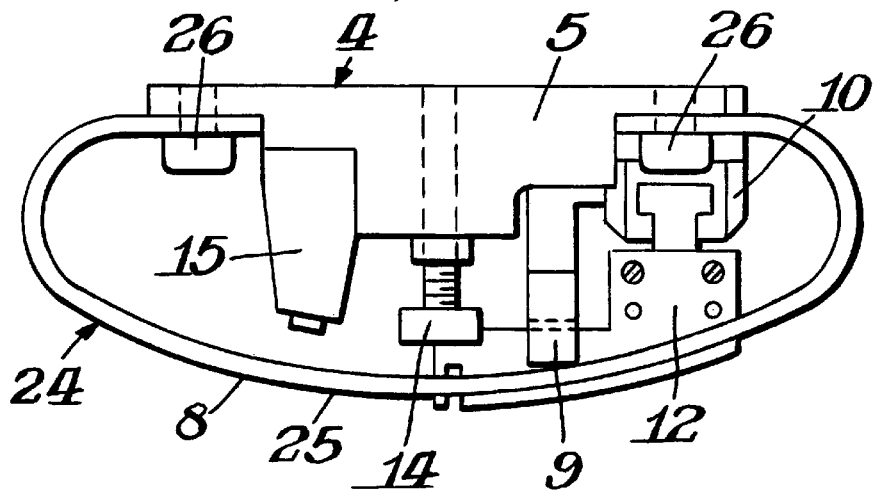

DEVICE FOR ATTACHING COMPENSATION WEIGHTS FOR PURPOSES OF UNBALANCE CORRECTION

BACKGROUND OF THE INVENTION

The present invention relates to a device for attaching compensation weights with an adhesive layer to an attachment surface of a rotatable component such as a vehicle wheel, for purposes of unbalance compensation. The device has holding structure with two holding parts to secure a compensation weight to the vehicle wheel. A pressing element between the holding parts is pressed onto a rear surface of the compensation weight opposite from the adhesive layer. A guide directs the holding structure to the unbalance compensation site of the attachment surface where the compensation weight is pressed onto the rotatable component.

In a device of this nature, in EP 0,681,169 B1, a compensation weight—with its edge that lies on the side bearing the adhesive layer—is placed onto the attachment surface by a guide. Subsequently, via a pressure transmission configured as a bolt, pressure is exerted onto the compensation weight against the attachment surface. As a result, the compensation weight swivels around the edge and is pressed with its adhesive surface onto the attachment surface. The pressure on the compensation weight may be exerted by an automatic actuation device, for example, an electric lifting magnet. This known device is only suitable for compensation weights having a relatively compact shape, since the contact pressure is transferred to the compensation weight at only one point.

DE 4,440,812 C2 discloses a device for gluing balancing weights onto shafts, which consists of pressing structure essentially having a basic element with an elastic, height-adjustable receptacle for the balancing weight. Underneath, guide bars pivot from the shaft mid-point to the shaft circumference, and between the guide bars and below the elastic receptacle, a height-adjustable molded shell is provided for pressing the balance weights. This device is only suitable for convex attachment surfaces.

SUMMARY OF THE INVENTION

The present invention is based upon the objective of creating a device of the type described above, which allows the automatic attachment of self-adhesive compensation weights having different and also sizable lengths, particularly to concave attachment surfaces.

According to the present invention, a pressing element has a pressing surface capable of being deformed as a function of pressing force. The rear surface of a compensation weight lies on the pressing surface. The pressing surface in the unstressed basic position of the pressing element has such a shape so that the pressing force is transferred to the middle section of the compensation weight, and as the pressing force increases, the pressing surface is deformed in such a way that the pressing force is also transferred onto the ends of the compensation weight.

With the device of the present invention it is possible to press a self-adhesive compensation weight onto the attachment surface of a component to be balanced in such a way that the compensation weight is first pressed in the middle and from there, it is progressively pressed towards the two ends in the circumferential direction of the component. As a result, the inclusion of air bubbles between the adhesive layer and the component is avoided, and a secure adhesion of the compensation weight is ensured. The device according to the invention also has the advantage that, within certain limits, it can automatically adapt to different radii of curvature of the attachment surfaces to which the compensation weights are applied. As the pressing force increases, the curvature of the pressing surface of the pressing element adapts to the curvature of the compensation weight that is being pressed against the attachment surface. In the longitudinal direction of the holding parts, the pressing surface can have a relatively sizable length, so that even very long compensation weights can be reliably pressed over their entire length.

In an advantageous embodiment of the device according to the invention, the pressing element consists of a leaf spring that has, on both of its ends, oppositely bent sections attached to one part of the holding means and, with its middle section, the leaf spring forms the pressing surface. This embodiment can be simply and inexpensively manufactured. It also has the advantage that, as the pressing force increases, it is distributed from the middle section over the entire length of the compensation weight and thus, even with sizable lengths, a uniform pressing of the compensation weight is obtained.

According to another proposal of the invention, the pressing element consists of two leaf spring arms that are separate from each other and that extend symmetrically in opposite directions from a middle plane of the device. The opposing ends are rigidly attached to a part of the holding structure. In this embodiment, one end of a leaf spring arm is preferably provided with a tongue that engages a recess in the end of the other leaf spring arm. This serves to bridge the joint between the leaf spring arms. In comparison to a one-part leaf spring, the leaf spring arms have less spring stiffness. As a result, they allow a shift in the point of action of the pressing force toward the area of the ends of a compensation weight, even when relatively weak forces are involved. The free end areas of the flexible leaf spring arms that form the pressing surface may also be configured so as to be thickened. This increases their dimensional stiffness, and they retain a predefined curvature, even under the load of the pressing force. In operation, the leaf spring arms produce a type of rolling motion on the rear surface of the compensation weight. In order to limit the elastic deformability of the leaf spring and of the leaf spring arms, adjustable stops may be mounted on the holding structure.

In order to limit the pressing force exerted by the guide structure, in another embodiment of the invention, the device is provided with a transducer that detects the elastic deformation of the pressing element. Once a predefined setpoint is reached, the pressing motion of the guide means is terminated and, after the holding parts are detached, the device is moved back into a starting position for the attachment of a new compensation weight. An example of a suitable transducer is a proximity switch, for example, positioned on a carrier part of the holding structure that responds to a certain approximation of the pressing element.

In another embodiment of the invention, in order to secure the compensation weight on the deformable part of the pressing element, the holding parts arranged on both sides of the pressing element are guided in such a way that they follow the positional change of the deformable part. Therefore, the holding parts can hold the compensation weight until the pressing procedure has been completed and this is accomplished without impairing deformation of the pressing element. Preferably, the holding parts are supported in the linear guides of a clamping mechanism attached to the pressing element.

BRIEF DESCRIPTION OF THE DRAWINGS

Novel features and advantages of the present invention in addition to those mentioned above will become apparent to persons of ordinary skill in the art from a reading of the following detailed description in conjunction with the accompanying drawing wherein similar reference characters refer to similar parts and in which:

FIG. 1 is a front elevational view of a device for attaching compensation weights with a pressing element in the form of two separate leaf spring arms, according to the present invention;

FIG. 2 is a side elevational view of the device shown in FIG. 1,

FIG. 3 is a front elevational view of another device for attaching compensation weights with two separate leaf spring arms, according to the present invention;

FIG. 4 is a partial bottom plan view of the pressing surface in the area of the ends of the leaf spring arms of the device shown in FIG. 3; and FIG. 5 is a front elevational view of another device for attaching compensation weights with a pressing element in the form of one single leaf spring, according to the present invention.

DETAILED DESCRIPTION OF THE INVENTION

Referring in more particularity to the drawings, FIGS. 1 and 2 show the angled end 1 of the arm of a guide, for example, of a manipulator or robot, that transports a balance weight—whose size has been determined by a balancing machine and cut to the appropriate length—to the balancing site, for example, of a vehicle wheel, and presses it onto the wheel with a defined force. At the end 1, there is a plate 2 on whose front face a pressing element 4 is attached by means of screws 3. The pressing element 4 has a carrier 5 in the middle thereof onto whose opposite sides U-shaped, symmetrically arranged leaf spring arms 6a, 6b have been shaped. The free end areas 7a, 7b of the leaf spring arms 6a, 6b have a thicker cross section and, with their outsides facing away from the carrier 5, they have a uniformly convex pressure surface 8. With the front surfaces facing each other, the end areas 7a, 7b can support each other but a small gap can also be provided. On the end area 7b of the leaf spring arm 6b in FIG. 1, on the side facing the carrier 5, a support 9 is attached by means of a screw, and support 9 has a pneumatic or electric clamping mechanism 10. The clamping mechanism 10 has two clamping jaws 11 that can be moved back and forth in opposite directions along a straight guide. By means of two extension rods, each clamping jaw 11 carries a plate-shaped holding part 12, one of which is arranged on one side while the other is on the other side of the end area 7b and parallel thereto. With their edges adjacent to the pressing surface 8, the holding parts 12 project at a constant height over the pressing surface 8 and extend in the longitudinal direction over the full length of the end area 7b.

As shown in FIGS. 1 and 2, a compensation weight 13 is clamped between the projecting edges of the holding parts 12, and the width of the compensation weight is greater than the width of the end areas 7a, 7b of the leaf spring arms 6a, 6b. In order to limit the deflection of the leaf spring arms 6a, 6b, two adjustable stop screws 14, against which the end areas 7a, 7b lie, are screwed into the carrier 5. Moreover, a proximity switch 15 is attached to the carrier 5 and is located opposite from the end area 7a of the leaf spring arm 6a, and it responds to a certain approximation of the end area 7a.

For purposes of attaining precisely positioned attachment, the compensation weight 13 is held by the holding parts 12 in such a way that it is arranged exactly in the middle on the pressing surface 8 of the pressing element 4, that is to say, with equally long sections on each end area 7a, 7b. The curvature of the pressing surface 8 is selected in such a way that it matches the predefined curvature of the rear surface 16 of the compensation weight 13. As a result, the rear surface 16 of the compensation weight 13 lies uniformly distributed on the support surface 8. The curvature of the compensation weight 13, which is intended for application onto a concave attachment surface 18 of a vehicle wheel 19, is defined in such a way that the surface of the compensation weight 13 provided with an adhesive layer 17 has a smaller radius of curvature than the attachment surface of the vehicle wheel. In order to apply the compensation weight 13, the described device is positioned in such a way that the compensation weight 13, when it is pressed onto the attachment surface 18, is at first pressed only against the middle section of the adhesive layer 17. As the pressing force increases, then the areas 7a, 7b of the leaf spring arms 6a, 6b are bent in the direction of the carrier 5. As a result, the force application site shifts from the middle of the compensation weight 13 in the direction of its ends, and the compensation weight is pressed against the attachment surface over its full length and is attached to the surface by the adhesive layer 17. Once the elastic deformation of the leaf spring arms 6a, 6b has reached the prescribed extent, the proximity switch 15 generates a switching signal by which the pressing procedure is ended and the clamping mechanism 10 is moved into the open position in order to release the compensation weight 13.

In the embodiment shown in FIG. 3, the pressing element 4 has a different shape. The carrier 5 screwed onto the plate 2 is configured as a rigid beam and has approximately the same length as the pressure surface 8 formed by the leaf spring arms 6a, 6b. The two leaf spring arms 6a, 6b are connected with a narrow bending radius to the ends of the carrier 5 and are bent towards each other in such a way that their free ends are across from each other at a small distance. The cross section of the leaf spring arms 6a, 6b is constant. Only the free ends, which lie opposite from each other, are reinforced in order to form a stop 20 that interacts with the stop screws 14. Both leaf spring arms 6a, 6b are curved and arranged with respect to each other in such a way that the pressure surface 8 that they form has a constant convex curvature, so that its radius of curvature is smaller than the smallest possible radius of curvature of the attachment surface 18, namely, by somewhat more than the radial thickness of the compensation weight 13. Since in this configuration, the free ends of the leaf spring arms 6a, 6b approximate each other when they are bent in the direction of the carrier 5 under the action of the pressing force, a gap 21 is provided between the free ends. As best seen in FIG. 4, this gap 21 is bridged by a tongue 22 arranged at the free end of the leaf spring arm 6b that engages in a recess 23 in the free end of the leaf spring arm 6a. As a result, shorter compensation weights are also reliably supported on both leaf spring arms 6a, 6b. The tongue 22 may be manufactured as a separate part and subsequently mounted onto the leaf spring arm 6a.

In contrast to the embodiments described above, the pressing element 4 of the device shown in FIG. 5 has one single leaf spring 24. The leaf spring 24 has a curved middle section 25 that forms the convex attachment surface 8. The two ends of the leaf spring 24 are curved towards each other in the opposite direction and attached to the carrier 5 of the pressing element 4 by means of screws 26. The spring band steel of which the leaf spring 24 is made has a uniform width and thickness. In order to limit the deflection of the middle section 25, as with the preceding embodiments, an adjustable stop screw 14 is provided and here, too, a proximity switch 15 serves to terminate the pressing procedure once the middle section 25 has reached a prescribed deflection. The clamping mechanism 10 with the holding parts 12 corresponds to the embodiment shown in FIGS. 1 and 2 and the clamping mechanism is connected to the middle section 25 by means of a support 9. As a result, a deflection of the middle section 25 is also transferred to the clamping mechanism 10 and to the holding parts 12, so that they follow the motion of the middle section 25 and do not strike against the attachment surface 18. When the device according to FIG. 5 presses a compensation weight, the middle section 25 of the leaf spring 24 is deformed in such a way that its curvature decreases. Therefore, the pressing force that was originally only exerted in the middle of the compensation weight is distributed over an ever-greater length of the compensation weight as the middle section 25 deflects more and more, until the compensation weight is finally pressed over its full length onto the attachment surface.

What is claimed is:

1. A device for attaching compensation weight with an adhesive layer onto an attachment surface of a rotatable component, for purposes of unbalance compensation, the device having holding means with two holding parts to secure a compensation weight, a pressing element between the holding parts applying a pressing force for pressing a rear surface of the compensation weight opposite from the adhesive layer, guide means for guiding the holding means to an unbalance compensation site of the attachment surface where the compensation weight is pressed onto the rotatable component, and wherein the pressing element has a pressing surface deformable as a function of the pressing force and on which a rear surface of the compensation weight is positioned, the pressing surface in an unstressed basic position of the pressing element having a shape whereby the pressing force is transferred to the middle section of the compensation weight, and, as the pressing force increases, the pressing surface is deformed in such a way that the pressing force is also transferred onto the ends of the compensation weight, and wherein the pressing element has a leaf spring with oppositely bent sections on its opposite ends attached to a part of the holding means, and wherein the leaf spring has a middle section forming the pressing surface.

2. A device according to claim 1 including adjustable stops mounted on the holding means, and wherein the stops limit deflection of the leaf spring.

3. A device according to claim 1 including a transducer constructed and arranged to detect elastic deformation of the pressing element.

4. A device according to claim 1 wherein the holding parts are arranged on both sides of the processing element and are guided on the deformable part of the pressing element in such a way that they follow the positional change of the deformable part.

5. A device according to claim 1 wherein the holding parts are supported in linear guides of a clamping mechanism attached to the pressing element.

6. A device according claim 1 wherein the pressing surface has a radius of curvature smaller than the smallest radius of curvature of the attachment surface by an amount that exceeds the thickness of the compensation weight.

7. A device for attaching compensation weight with an adhesive layer onto an attachment surface of a rotatable component, for purposes of unbalance compensation, the device having holding means with two holding parts to secure a compensation weight, a pressing element between the holding parts applying a pressing force for pressing a rear surface of the compensation weight opposite from the adhesive layer, guide means for guiding the holding means to an unbalance compensation site of the attachment surface where the compensation weight is pressed onto the rotatable component, and wherein the pressing element has a pressing surface deformable as a function of the pressing force and on which a rear surface of the compensation weight is positioned, the pressing surface in an unstressed basic position of the pressing element having a shape whereby the pressing force is transferred to the middle section of the compensation weight, and, as the pressing force increases, the pressing surface is deformed in such a way that the pressing force is also transferred onto the ends of the compensation weight, and wherein the pressing element has two leaf spring arms separate from each other and extending symmetrically in opposite directions from a middle plane of the device, and wherein opposing ends of the leaf spring arms are rigidly attached to part of the holding means.

8. A device according to claim 7 wherein the flexible leaf spring arms include rigid free end areas that form the pressing surface.

9. A device according to claim 7 wherein a free end of one of the leaf spring arms has a recess, and a tongue that lengthens the free end of the other leaf spring arm engaging the recess.

10. A device according to claim 7 including adjustable stops mounted on the holding means, and wherein the stops limit deflection of the leaf spring arms.

11. A device according to claim 2 including a transducer constructed and arranged to detect elastic deformation of the pressing element.

12. A device according to claim 7 wherein the holding parts are arranged on both sides of the processing element and are guided on the deformable part of the pressing element in such a way that they follow the positional change of the deformable part.

13. A device according to claim 7 wherein the holding parts are supported in linear guides of a clamping mechanism attached to the pressing element.

14. A device according claim 7 wherein the pressing surface has a radius of curvature smaller than the smallest radius of curvature of the attachment surface by a amount that exceeds the thickness of the compensation weight.

* * * * *

UNITED STATES PATENT AND TRADEMARK OFFICE
CERTIFICATE OF CORRECTION

PATENT NO.    : 6,539,852 B2
DATED         : April 1, 2003
INVENTOR(S)   : Walter Ertl It is certified that error appears in the above-identified patent and that said Letters Patent is hereby corrected as shown below:

Column 6,
Line 55, delete "a" and insert -- an --.

Signed and Sealed this

Twenty-fourth Day of June, 2003

JAMES E. ROGAN
*Director of the United States Patent and Trademark Office*